United States Patent
Fee

(10) Patent No.: US 11,671,567 B2
(45) Date of Patent: Jun. 6, 2023

(54) IN-BAND VIDEO COMMUNICATION

(71) Applicant: CONTROLLED ELECTRONIC MANAGEMENT SYSTEMS LIMITED, Belfast (GB)

(72) Inventor: Paul Fee, Belfast (GB)

(73) Assignee: CONTROLLED ELECTRONIC MANAGEMENT SYSTEMS LIMITED, Belfast (GB)

( * ) Notice: Subject to any disclaimer, the term of this patent is extended or adjusted under 35 U.S.C. 154(b) by 33 days.

(21) Appl. No.: 17/370,975

(22) Filed: Jul. 8, 2021

(65) Prior Publication Data

US 2023/0008710 A1     Jan. 12, 2023

(51) Int. Cl.
| | |
|---|---|
| *H04N 7/18* | (2006.01) |
| *H04L 65/60* | (2022.01) |
| *H04L 65/80* | (2022.01) |

(52) U.S. Cl.
CPC ............ *H04N 7/185* (2013.01); *H04L 65/60* (2013.01); *H04L 65/80* (2013.01); *H04N 7/18* (2013.01)

(58) Field of Classification Search
CPC .......... H04N 7/185; H04N 7/18; H04L 65/60; H04L 65/80
See application file for complete search history.

(56) References Cited

U.S. PATENT DOCUMENTS

| | | | | |
|---|---|---|---|---|
| 10,212,306 B1 * | 2/2019 | Goyal | ............... | H04N 1/00251 |
| 2008/0288986 A1 * | 11/2008 | Foster | ............... | H04N 21/4367 |
| | | | | 348/E7.086 |
| 2013/0166711 A1 | 6/2013 | Wang et al. | | |
| 2020/0280761 A1 | 9/2020 | Staples | | |
| 2020/0334470 A1 * | 10/2020 | Abeykoon | ............... | H04N 7/18 |

OTHER PUBLICATIONS

Al Hindawi et al., "A New Data Hiding Technique for Surveillance Applications," 2020 Advances in Science and Engineering Technology International Conferences (ASET), IEEE, Feb. 4, 2020, 5 pages.
EZVIZ C3A+W2D User Manual, Hangzhou EZVIZ Software Co., Ltd., Jan. 2019. Retrieved from the Internet on Sep. 23, 2022, <URL:https://mfs.ezvizlife.com/User+Manual-C3A%2BW2D.pdf?ver+62195&_gl +1*1bm5gg0*_ga*MTQ5MDkyMzU0Mi4xNjYzOTE1NzQz*_ga_GFXNRVT2BW*MTY2MzkxNTc0My4xLjEuMTY2MzkxNjA3Ny40)C4wLjA>, 29 pages.
International Search Report and Written Opinion in PCT/IB2022/056347, dated Oct. 6, 2022, 14 pages.

* cited by examiner

*Primary Examiner* — Randy A Flynn
(74) *Attorney, Agent, or Firm* — ArentFox Schiff LLP

(57) ABSTRACT

A method for video management within a CCTV system includes receiving, at a computing device via one or more intermediate devices in the CCTV system, a video stream generated by a sensor device of the CCTV system. The video stream includes a plurality of video frames. The computing device sends, via the one or more intermediate devices of the CCTV system, an instruction to a sensor device configured to generate a video stream including a plurality of video frames. The computing device receives, via the one or more intermediate devices of the CCTV system, one or more frames of the plurality of video frames embedded with metadata associated with performance of the instruction by the sensor device. Performance of the CCTV system is evaluated using the metadata embedded within the one or more video frames.

18 Claims, 6 Drawing Sheets

IN-BAND VIDEO COMMUNICATION

BACKGROUND

The present disclosure relates generally to a video surveillance management system, and more specifically, to in-band video communication.

Generally, a CCTV (closed circuit television) system is comprised of numerous devices. Occasions arise when it is desirable for these devices to communicate with each other. However, intermediate pieces of equipment within the CCTV system may not be setup to facilitate such communication. For instance, video may pass through a collection of devices, which are known to transport the video but may not be able to transport additional communications channels.

Accordingly, improvements in video surveillance management systems are needed.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure provide a method for using in-band data as a general-purpose communications channel.

In an implementation, for example, the present disclosure includes a method for video management within a CCTV system. The method includes receiving, at a computer device via one or more intermediate devices in the CCTV system, a video stream generated by a sensor device of the CCTV system. The video stream includes a plurality of video frames. The computer device sends, via the one or more intermediate devices of the CCTV system, an instruction to a sensor device configured to generate a video stream including a plurality of video frames. The computer device receives, via the one or more intermediate devices of the CCTV system, one or more frames of the plurality of video frames embedded with metadata associated with performance of the instruction by the sensor device. Performance of the CCTV system is evaluated using the metadata embedded within the one or more video frames.

In another aspect, a method for embedding metadata into a video stream within a Closed Circuit Television (CCTV) system that includes generating, by a sensor device of the CCTV system, a video stream including a plurality of video frames, and transmitting, by the sensor device via one or more intermediate devices in the CCTV system, the generated video stream to a receiving computing device. The method further includes receiving, by the sensor device via the one or more intermediate devices in the CCTV system, an instruction from the receiving computing device, and performing, by the sensor device of the CCTV system, the instruction received from the receiving computing device. Also, the method includes embedding, by the sensor device of the CCTV system, metadata associated with performance of the instruction by the sensor device into one or more frames of the plurality video frames. Additionally, the method includes transmitting, by the sensor device via one or more intermediate devices in the CCTV system, metadata associated with performance of the instruction by the sensor device into one or more frames of the plurality video frames.

Additional aspects may include an apparatus including a memory and a processor coupled with the memory and configured to perform either of the above-noted methods. Further aspects may include a computer-readable medium storing instructions executable by a processor to perform either of the above-noted methods.

In another aspect, a CCTV system for video management includes a hardware processor configured to receive, via one or more intermediate devices in the CCTV system, a video stream generated by a sensor device of the CCTV system. The video stream includes a plurality of video frames. The hardware processor is also configured to: send, via the one or more intermediate devices of the CCTV system, an instruction to a sensor device configured to generate a video stream including a plurality of video frames and receive, via the one or more intermediate devices of the CCTV system, one or more frames of the plurality video frames embedded with metadata associated with performance of the instruction by the sensor device. The hardware processor is further configured to evaluate performance of the CCTV system using the metadata embedded within the one or more video frames.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Aspects set forth below place in-band metadata within audio/video streams to help annotate each video frame and to facilitate diagnostics. The inserted metadata may be used to validate video transmission through a series of devices despite intermediate equipment being unaware of the additional metadata within the transmitted stream. The metadata may also aid performance measurements, such as round-trip latency within a CCTV system.

Figure 1:
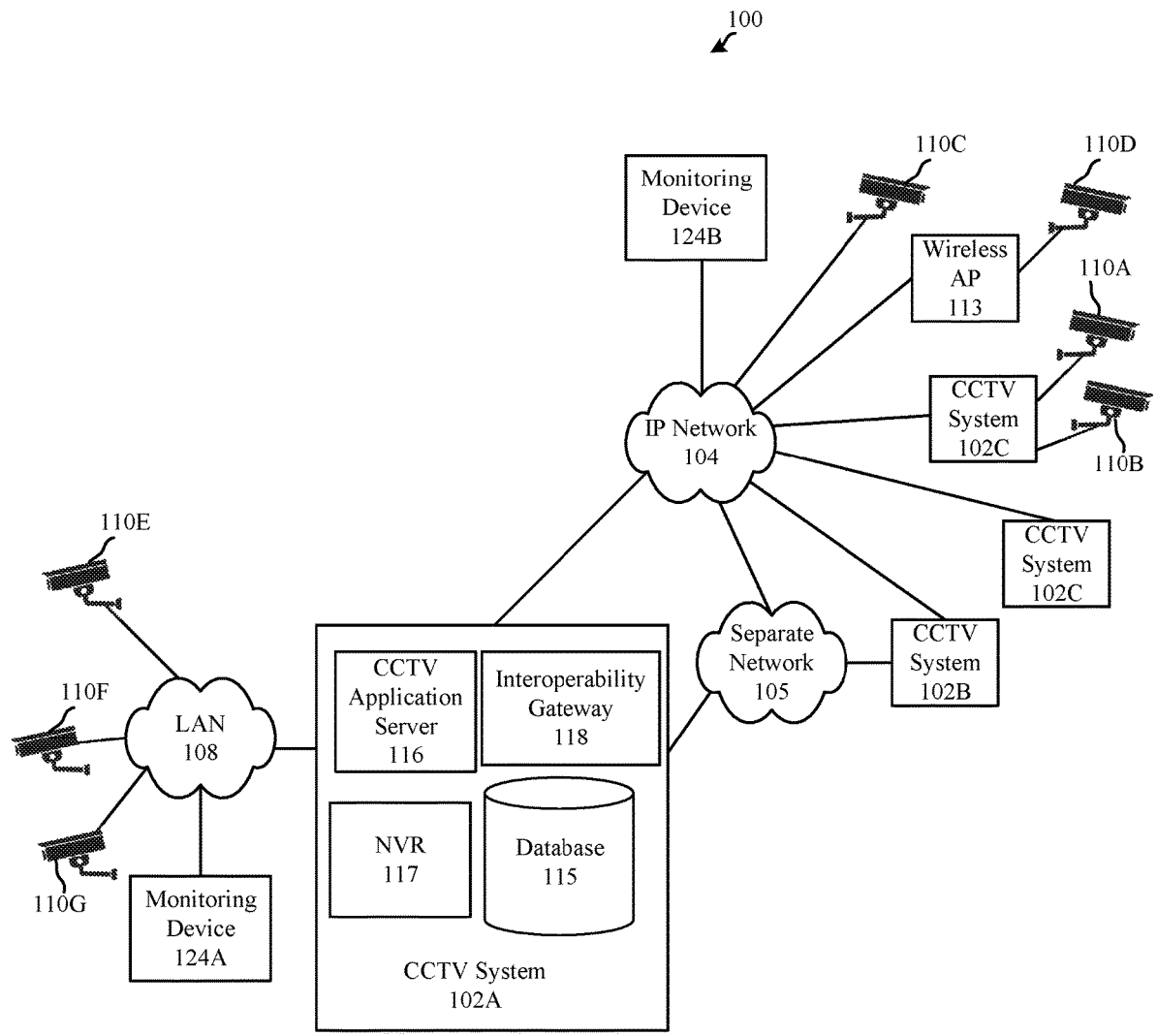
FIG. 1 is a block diagram of a system for video management within CCTV systems.
Figure 6:
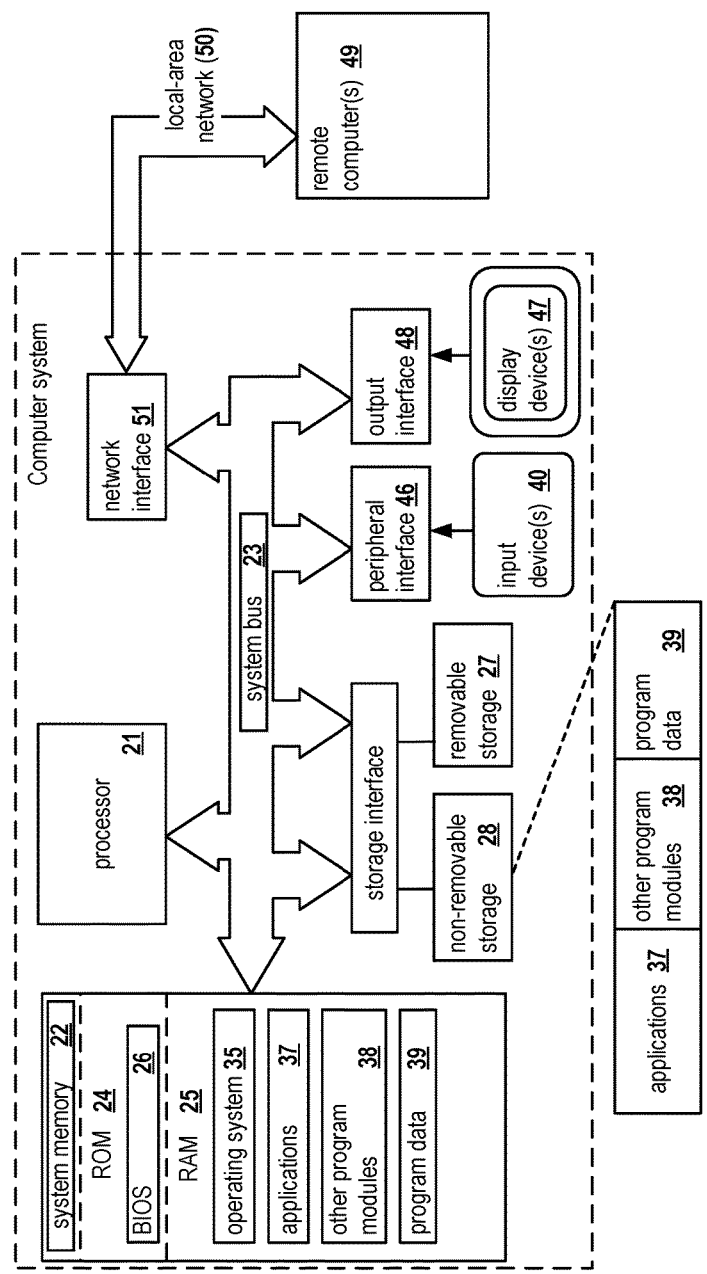
FIG. 6 illustrates an example of a general-purpose computer system.

FIG. 1 is a block diagram illustrating an example system 100 for video management within CCTV systems. As shown, system 100 illustrates CCTV systems 102 (including systems 102A through 102C), CCTV application server 116, sensors (e.g., video cameras) 110 (including sensors 110A through 110G), monitoring devices 124 (including devices 124A and 124B), and networks including, for example, Local Area Network (LAN) 108, and Internet Protocol (IP) Network 104. One or more of the devices or systems shown may be implemented on one or more computing devices using hardware, software, or a combination thereof. Such a computing device is shown in FIG. 6 and may include, but is not limited to, a device having a processor and memory, including a non-transitory memory, for executing and storing instructions. The memory may tangibly embody the data and program instructions. Software may include one or more applications and an operating system. Hardware may include, but is not limited to, a processor, memory, and graphical user interface display. The computing device may also have multiple processors and multiple shared or separate memory components. For example, the computing device may be a part of or the entirety of a clustered computing environment.

CCTV system 102A-C may each include a variety of network interfaces (not shown) including wireless and wired network interfaces to support a variety of network protocols. Each CCTV system 102, may implement and host one or more CCTV applications for management of one or more video cameras 110 across one or more networks. In an aspect, CCTV system 102A, for example, may manage or monitor video cameras 110E-G through LAN 108 and video cameras 110A-D through Internet Protocol (IP) network 104.

Video cameras 110 may be mounted surveillance video cameras that are analog cameras or IP cameras, which may be powered over Ethernet cables (PoE). Such surveillance cameras may have pan, tilt, and zoom (PTZ) capabilities. In an aspect, video camera 110 may capture a video feed and may insert metadata associated with an operating status of the video camera to be transmitted, via a network, to one or more of CCTV systems 102 managing video camera 110. The metadata may include at least one of the following information related to video camera 110: unique video camera identifier (ID), group video camera ID, one or more associated user IDs, geolocation information, timestamp of captured video, direction, inclination, angle, moment, velocity, acceleration, or other environmental parameters.

For example, video cameras 110A-D may be representative of surveillance cameras mounted on the exterior of and/or within office buildings, near bus stops, at traffic intersections, etc. Video cameras 110A-B may be managed through CCTV server 116 having connection to IP network 104.

In an aspect, video cameras, such as video cameras 110D, may be coupled to wireless access point (AP) 113 that transmits video streams to CCTV system 102A through IP network 104. In a further aspect, video cameras, such as video camera 110C, may include networking hardware to connect to IP network 104 directly. In an aspect, one or more video cameras 110, such as video camera 110C, may be wearable video cameras.

In an aspect, to integrate various communications functionality, e.g., in-band data as a general-purpose communications channel functionality, within a CCTV system, CCTV system 102A may include CCTV application server 116, database 115, network video recorder (NVR) 117, and interoperability gateway 118.

CCTV application server 116 may provide the functionality of the CCTV application through one or more graphic user interfaces (GUI) such as those that will be further described. In an aspect, the CCTV application may be a server-based software application communicatively coupled to software clients installed and operating on computing devices, such as monitoring device 124. In an aspect, the installed software clients may instead be application instances of the CCTV application.

In an aspect, interoperability gateway 118 may include logic to enable multimedia communications including, but not limited to, video file or video camera feed data to be transmitted to or shared with a separate or distinct CCTV system, such as CCTV systems 102B or 102C. Each of CCTV systems 102B and 102C may operate a different communication or network interface. In an aspect, interoperability gateway 118 may transmit the multimedia communications to interoperability gateways or console applications residing on separate network 105 or within, for example, CCTV system 102B. Each of separate network 105 and CCTV system 102B may be under the control or administration of an agency or operator different from that administering CCTV system 102A.

Additionally, interoperability gateway 118 may validate a video stream's sharing permissions based on metadata associated with or embedded within the video feed. Upon validation, interoperability gateway 118 may retransmit or authorize transmission of the video stream to CCTV systems 102 or across other networks.

Database 115 may be any type of structured data store, including a relational database that stores information associated with entities using the CCTV application provided by CCTV system 102A or associated with entities being controlled through CCTV system 102A. For example, information associated with using entities may include information or parameters of operators and associated computing devices 124. Information associated with controlled entities may include metadata to be inserted into a corresponding video stream by video cameras 110.

NVR 117 may be one or more video storage devices having application software for storing, searching, and retrieving stored video files. In an aspect, NVR 117 may store video files in association with metadata tags, keywords, and other associated information files that are relationally associated with the video file and/or which are embedded as metadata within the video format and stored file.

Therefore, NVR 117 may enable an operator accessing the CCTV application to not only view a live video feed but also retrieve stored video feeds of video cameras 110 based on one or more search criteria. In an aspect, an operator may input a search criterion within the CCTV application managed by CCTV application server 116. NVR 117 may receive the search criterion and query the stored video files based on the search criterion to locate one or more video files associated with the search criterion. In an aspect, NVR 117 may be representative of a system of devices, each of which may be implemented on one or more processors.

Monitoring device 124 may be one or more stationary devices at a control monitoring center or station that are used by one or more operators to monitor one or more video cameras 110. An operator may interface with a client or CCTV application instance on the monitoring device 124 to access the video streams provided by video cameras 110.

Figure 2:
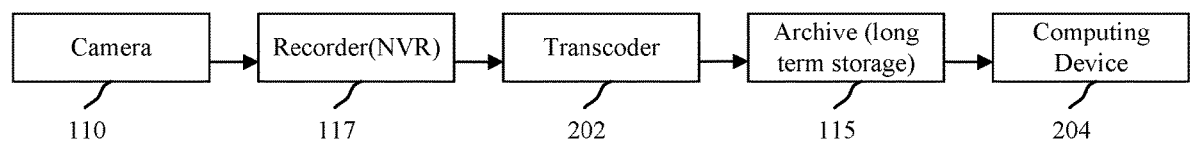
FIG. 2 is a block diagram of illustrating an example of video traversing through a number of intermediate devices before being displayed to a user of the CCTV system.

FIG. 2 is a block diagram of illustrating an example of video traversing through a number of intermediate devices before being displayed to a user of the CCTV system.

In FIG. 2, a particular video stream traverses a number of devices, e.g., devices 110, 117, 202, 115, and 204 before being displayed.

In an aspect, a camera 110 is the source of the video stream, which is received by a recorder 117 (such as NVR) for initial, short term storage. NVRs 117 are typically built around and deployed with memories of limited sizes, in order to contain cost. While mass storage and mass storage management may be included in such devices, for example, a computer-type hard drive. A 'lightweight' memory solution is envisioned in an aspect, in which an abbreviated memory or memory buffer is used to temporarily store video streams collected during a predetermined time of service, for example a day. Periodically or upon user's request, NVR 117 may transfer the collected video streams to a different memory for management and analysis, such as an archive 115.

In an aspect, a transcoder 202 may alter the video stream by decoding (for example, from an H.264 format), altering (e.g. reducing the resolution) and encoding once more (for example, back to the H.264 format). The ability to perform transcoding on the fly may simplify storage and management involved with supporting adaptive streaming. It will be appreciated that by generating requested video stream portions on the fly, the amount of storage required to implement adaptive streaming may be reduced significantly.

In an aspect, monitoring devices 124 (shown in FIG. 1) often may need to retrieve previously stored video data from a data archive library systems 115 that may be connected to the CCTV application server 116 and/or NVR 117 for data archiving. The data archiving solutions 115 may employ one or more tape library systems. To mitigate the unnecessary transfer of unwanted data during the search for specific data, the desired data may be identified based on information other than the data itself, before the entire set of video streams are retrieved from the tape library to the user. Such a technique for screening of data improves the overall performance and usability of the archive system 115. In an aspect, video streams fetched from the archive system 115 may be viewed by users using a computing device having a video display 204.

During CCTV product development process, it may be useful for devices 110-117 and 202-204 to communicate with each other. It should be noted that at least some of the devices 110-117 and 202-204 may be from different vendors and could be incompatible with each other. The inter-device communication is important because each of the aforementioned devices 110-117 and 202-204 serves a particular function. The computing device 204 may, for example, need to verify that: 1) every video frame is present in the received video stream; 2) every video frame is received in the correct order; 3) every video frame is received from the correct camera; and 4) every video frame is received with the correct timing data.

In aspects that include the disclosed CCTV system, each video frame may be annotated with metadata. This scheme enables devices receiving the video stream 115-117 and 202-204 to extract the metadata and confirm that the video stream had traversed the intermedia devices correctly. Aspects of the inventive concept disclosed herein provide mechanisms for distributing the metadata between the devices 110-117 and 202-204. Placing the metadata in-band allows it to pass through devices not necessarily designed to carry additional data. Advantageously, the computing device 204 may extract the metadata included within the video stream received from the camera 110 to evaluate the performance of the CCTV system, such as performance measurements and fault detection.

In aspects, the computing device 204 thus can employ the metadata, describing an operating status of one or more devices 110-117 and 202 to assess network quality and latency, for example. In aspects, when the video camera 110 comprises a motorized camera having PTZ capabilities, the computing device 204 may be interested in determining PTZ responsiveness time of the video camera 110. Pan/tilt base of the PTZ video camera 110 may have a pan range of 360° continuous. In other words, pan/tilt base of the camera 110 can move in any direction. The pan/tilt base also may have a tilt range of +90° to −90° from level. The pan/tilt base may incorporate other dimensions and capabilities as needed. The pan/tilt base may incorporate a step motor in moving the camera 110 to desired positions. Thus, when an operator instructs the camera 110 to pan left, the computing device 204 may need to know how long does it take for this instruction to be reflected within the camera video stream.

In an aspect, the CCTV application server 116 may be configured to provide a GUI to perform contiguous video camera alignment. This functionality may be provided via additional user interface elements included in the above-mentioned GUI for specifying lane/path boundaries. Contiguous video camera alignment refers to the fact that during an initial camera hardware installation process, or if existing camera hardware is later updated, if the camera 110 is equipped with PTZ function, the pan, tilt, and/or zoom settings of the camera 110 need to be adjusted and/or calibrated to ensure there is sufficient overlap in the field of vision between cameras. The CCTV application server 116 can review the received metadata to determine whether a handoff zone of sufficient size and/or duration is provided by a pair of cameras. If not, pan, tilt, and/or zoom settings may require changes, or the physical installation location of a camera may need to be changed altogether. In an aspect, the metadata within the analyzed video stream could contain acknowledgements of PTZ instructions, allowing the computing device 204 receiving the video stream to measure PTZ round trip latency, for example.

Figure 3:
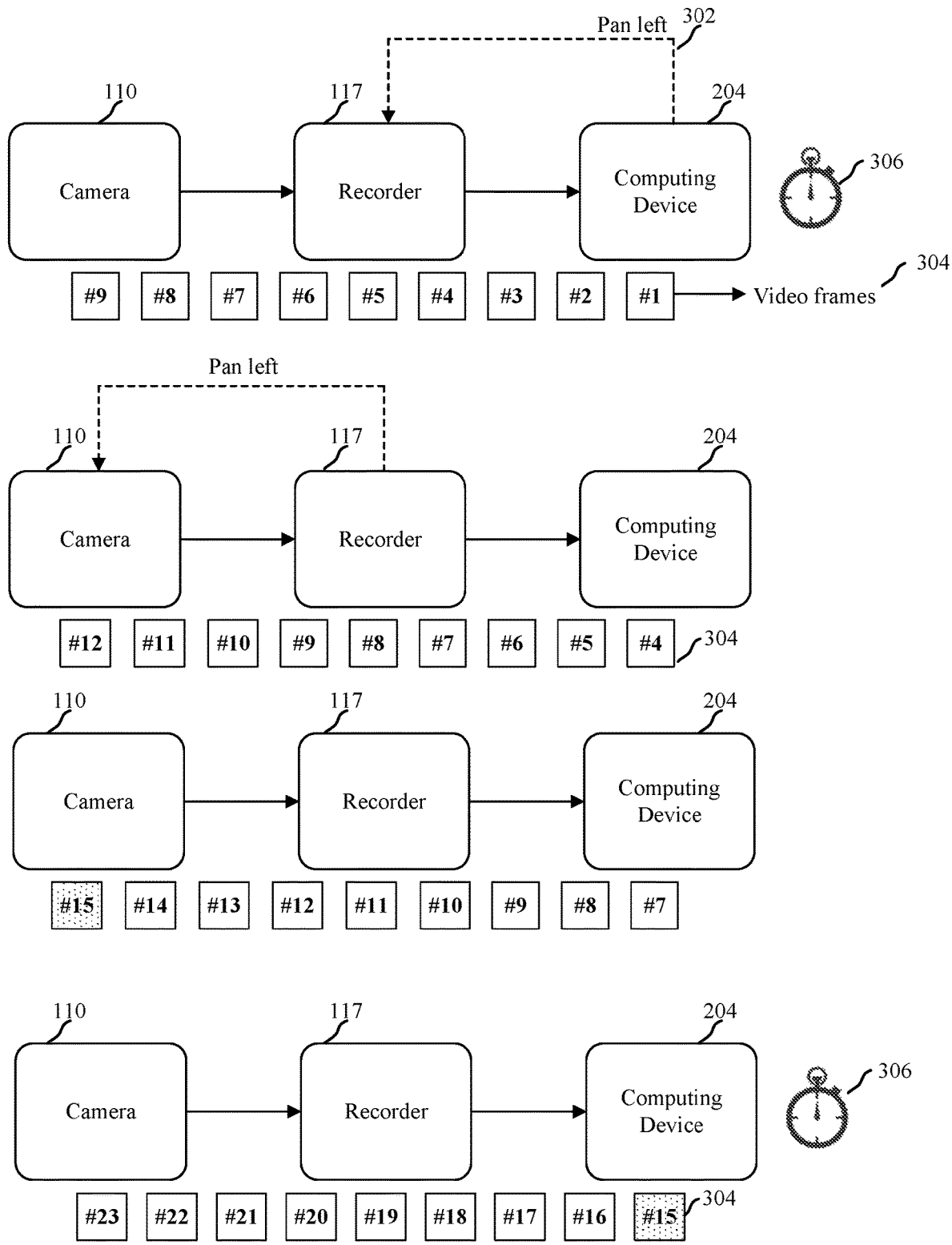
FIG. 3 is a block diagram illustrating propagation of video frames while processing and acknowledging received instruction within the CCTV system.

FIG. 3 is a block diagram illustrating four different snap shots in time representing propagation of video frames while processing and acknowledging received instruction within the CCTV system. As shown in FIG. 3, a technician (operator) may use a control console (not shown in FIG. 3) communicatively coupled to the computing device 204 to send an instruction 302 to the camera 110. In this example, the PTZ instruction 302 may request the pan/tilt base of the camera 110 to pan the camera 110 left. In response to sending the instruction 302, the computing device 204 may start the clock 306 to measure PTZ round trip latency.

While the PTZ instruction is sent by the computing device 204, a video stream comprising a plurality of video frames 302 is transmitted from the video camera 110 to the computing device 204 via the recorder device 117. In this example, the plurality of video frames 302 include frame #1 through frame #23. In an aspect, the cross-hatching or lack thereof in the box representing each frame represents frames captured before the instruction 302 is received by the camera 110 (e.g., frame #1 through frame #14), a frame in which the instruction 302 is received and processed (e.g., frame #15), and frames captured after the instruction 302 is executed by the camera 110 (e.g., frame #16 through frame #23). The recorder device 117 in this example comprises an intermediate device.

The PTZ instruction 302 progresses through intermediate devices (the recorder 117) and eventually reaches the video camera 110. It should be noted that video frames 304 already in flight (e.g., frame #1 through frame #14) arrive to the computing device 204 unaffected by the PTZ instruction 302. When the PTZ instruction 302 arrives at the video camera 110 (e.g., at frame #15), the pan/tilt base of the camera 110 adjusts its position according to the received PTZ instruction 302. Subsequent portions of the video stream (e.g., frame #16 through frame #23) reflect adjusted field of view.

In an aspect, in response to receiving the PTZ instruction 302, the video camera 110 may insert metadata into the frame numbered 15 that acknowledges the received PTZ instruction 302. As video camera 110 continues to transmit the video stream towards the computing device 204, eventually, the frame number 15 reaches the computing device 204. In response, the computing device 204 may stop the clock 306 and may measure the PTZ round trip latency.

Further, the in-band measurement of CCTV network performance may be useful during development of CCTV systems. To achieve maximum efficiency, intermediate devices (in this example the video recorder 117) should relay both instructions and video data (video stream) with minimal latency. Effectively, any device along the video pathway of a particular video stream that can intercept the in-band messages can read, modify and relay the in-band message. Incompatible devices would generally transmit the received in-band message untouched. During product development, system performance measurements, such as latency measurements for example, can help highlight performance bottlenecks, enabling subsequent product improvements.

Similarly, latency measurements can also be useful during deployment of CCTV equipment. When the physical distance between the end devices becomes large, factors such as network topology, equipment selection and protocol choice may influence the overall performance of the system. Based on system performance measurements on real world deployments, system performance may be improved by diagnosing existing issues and by facilitating system tuning.

As described above, the system performance may be evaluated based on the metadata included within the video frames of a video stream. However, audio channels may also carry data. In an aspect, human discernible or detectable tones can be used by the CCTV system to convey metadata. A challenge exists in delivering distributed multimedia to devices within the CCTV system so that video imagery and/or audio is/are synchronized. Audio, video, and/or the like, may become disinteresting if the time synchronization is not managed effectively. The aforementioned metadata embedded within audio channels could be used to facilitate measurement of audio/video synchronization. Some systems transmit and store audio and video channels separately, leading to time drift between the two channels. In other words, with inter-stream synchronization, the play-out of one media stream, e.g., a video stream, may constitute a reference for the play-out of another media stream, e.g., an audio stream, or vice versa, e.g., to achieve lip synchronization. Metadata in both audio and video channels can be used to measure this lip synchronization.

Figure 4:
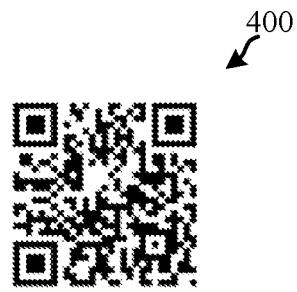
FIG. 4 is an example of metadata transmitted within a video stream.

FIG. 4 is an example of metadata transmitted within a video stream. In the illustrated example, to facilitate the transmission of metadata within a video stream, modifications are placed within the frames that constitute a video. In an aspect, each frame of a video stream may contain embedded content that conveys the data to be transmitted. Such embedded content should be able to survive intermediate transmission and modification by intermediate devices. Furthermore, such embedded content should be recognizable and decodable by compatible receiver devices. In an aspect, inserting metadata into the one or more video frames of the annotated video stream may include inserting a 2-dimensional bar code representing the metadata into the one or more video frames. One such inserting technique could be to place a QR code 400 within each image. For example, QR codes 400 can be of a same size, or of a threshold number of sizes with each size being visually identifiable (e.g., each size may be a particular color). Furthermore, the QR code 400 may occupy the entire video frame or a portion of the video frame.

The size of the QR code 400 may be influenced by a number of factors. One factor that may influence the size of the QR code 400 may be how much information (for example, how many bits) may each QR code 400 store. Resolution of the video frames into which the QR code 400 may be placed is another factor. This allows for the transmission and reception of metadata within large, high resolution still images and video as well as their display on a screen with 1136×640 resolution that delivers 326 pixels-per-inch (ppi), for example. Yet another factor that may influence the size of the QR code 400 may be whether the resolution of the video frame containing the embedded metadata may be reduced by intermediate devices. The use of a larger QR code 400 may tolerate better the reduction of the resolution by the intermediate devices.

A further aspect is that a device inserting the QR code 400 (for example, video camera 110) can choose to have different QR codes 400 be placed in each video frame or each QR code 400 may linger for a few frames. If each frame stores a number of metadata bits and video has a frame rate, the bitrate of the disclosed metadata communication channel may be determined by multiplying the bitrate and the frame rate.

Few different encoding schemes are possible. In a first scheme, each QR code 400 may store metadata associated with an individual frame. In a second scheme, a single, static QR code 400 may persist across a few different video frames. This scheme allows spatial scalability with multiple qualities (e.g., resolution, bitrate, frame rate, or other quality). The video stream of the low quality video, which can have, for example, low resolution, bitrate, frame rate, or other quality may be sent between the intermediate devices. It should be noted that the computing device 204 may encode this low quality stream back for playing, such that the highest quality video is available for rendering. Furthermore, this scheme enables reception of metadata across "air gaps", where the video stream could be displayed on screen and then captured and decoded by another video camera. Video recording involves capturing multiple images using a fixed frame rate. However, in this case the video camera's 110 recording frame rate need not necessarily match the frame rate of the computing device 204. In an aspect, in a third scheme, a sequence of different QR codes 400 representing a stream of metadata may be inserted into two or more video frames of the annotated video stream. This technique may be useful when the size of the metadata to be encoded is greater than what can be encoded into a single frame.

It should be noted that metadata encoding schemes are not limited to 2-dimensional bar codes 400 illustrated in FIG. 4. In an optional aspect, the metadata may be encoded by inserting a series of pixels along the edge of the image. The conventional vertical blanking interval (VBI) of a transmitted video signal may preferably be used to carry the metadata. It is appreciated that transport of VBI data is also typically provided in digital television systems to support features of an incumbent analogue video, and since the VBI data is frame related, the VBI data may be used to carry a frame reference from the video camera 110 to the computing device 204. It is appreciated that any VBI line may be used, but typically, VBI lines that are used for Vertical Interval Timecode or for Teletext lines may be employed. Teletext supports private data carriage, and is therefore capable of transporting a data value representing metadata for each video frame. In yet another scheme, the metadata could be encoded with the aid of steganographic methods. It should be noted, however, that these steganographic methods have to survive an encoding and decoding process. The scheme utilizing steganographic methods enables the described communication channel to be used alongside intended CCTV use, rather than being limited to system testing scenarios.

As noted above, for the in-band placement of metadata within audio channels, tones such as the dual tone multi-frequency (DTMF) signals used for telephones may provide one audio encoding approach. The use of audio channels for metadata transmission may be used to facilitate measurement of audio/video synchronization. The in-band placement of metadata within audio channels may also be used as a low-bandwidth general purpose one-way communication channel.

Figure 5:
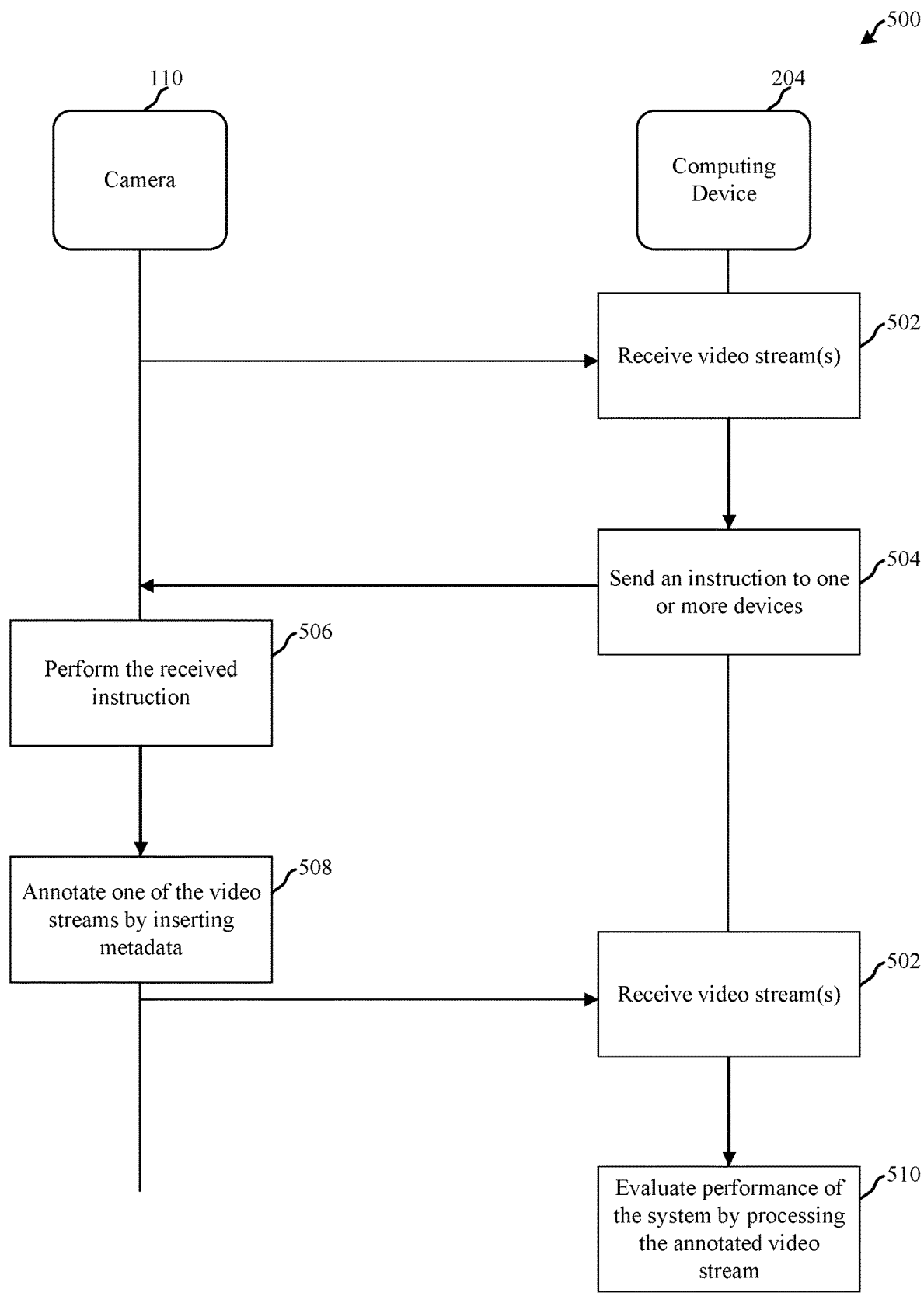
FIG. 5 is a flowchart of a method for video management within a CCTV system.

FIG. 5 is a flowchart of a method for video management within a CCTV system. The method 500 may be performed in some portions by an apparatus such as the computing device 204 and in other portions by an apparatus such as the sensor (e.g. camera) device 110, as described herein with reference to FIG. 6.

At 502, the computing device 204 may receive one or more video streams from one or more sensors of the CCTV system. In an aspect, the one or more sensors may include one or more video cameras 110. The video stream(s) may be transmitted via one or more intermediate devices 115-117 and 202. At least one of the one or more intermediate devices may be configured to alter the video stream to improve transmission and/or storage of the video stream. For example, a transcoder 202 (shown in FIG. 2) may alter the video stream by decoding (for example, from an H.264 format), altering (e.g. reducing the resolution) and encoding once more (for example, back to the H.264 format). The ability to perform transcoding on the fly may simplify storage and management involved with supporting adaptive streaming. In some aspects, the one or more streams may include multiple streams, of respective resolutions and/or frame rates, of the raw video captured by the camera(s) 110. In some aspects, the multiple streams may include a "primary" stream with a certain resolution and frame rate, corresponding to the raw video captured by the camera 110, and one or more additional streams. An additional stream may be the same video stream as the "primary" stream but at a different resolution and/or frame rate, or a stream that captures a portion of the "primary" stream (e.g., cropped to include a portion of the field of view or pixels of the primary stream) at the same or different resolution and/or frame rate as the "primary" stream.

At 504, the computing device 204 may send one or more instructions to the camera 110. As shown in FIG. 3, a technician (operator) may use a control console (not shown in FIG. 3) communicatively coupled to the computing device 204 to send an instruction 302 to the camera 110. In an aspect, the instruction may be a PTZ instruction. The PTZ instruction 302 may request the pan/tilt base of the camera 110 to pan the camera 110 left. In response to sending the instruction 302, the computing device 204 may start the clock 306 to measure PTZ round trip latency. While the PTZ instruction is sent by the computing device 204, a video stream comprising a plurality of video frames 302 is transmitted from the video camera 110 to the computing device 204 via the recorder device 117. The recorder device 117 in this example represents an intermediate device.

At 506, in response to the arrival of the instruction, the video camera 110 may perform the received instruction. For example, the camera 110 may adjust its position according to the received PTZ instruction 302. Subsequent portions of the video stream should reflect adjusted field of view. In an aspect, at 508, in response to receiving the instruction, the video camera 110 may insert metadata that acknowledges the received instruction into the next outgoing frame. The metadata may include at least one of the following information related to the video camera 110: unique video camera identifier (ID), group video camera ID, one or more associated user IDs, geolocation information, timestamp of captured video, direction, inclination, angle, moment, velocity, acceleration, or other environmental parameters. The metadata embedded within the one or more frames represents an in-band channel. In an aspect, the metadata may include a 2-dimensional bar code (such as QR code 400) representing the metadata. This bar code may occupy at least a portion of the one or more video frames. In an aspect, the metadata may comprise a same metadata in each of the one or more video frames. In yet another aspect, the metadata includes a steganography image.

The video camera 110 continues to transmit the video stream towards the computing device 204. The first frame having embedded metadata may reach the computing device 204.

At 510, the computing device 204 may evaluate performance of the CCTV system based on the received metadata. For instance, at 510, the computing device 204 may stop the clock 306 and may determine the PTZ round trip latency. During product development, system performance measurements, such as latency measurements for example, can help highlight performance bottlenecks, enabling subsequent product improvements. In an aspect, evaluating performance of the CCTV system may further include verifying proper sequential order of one or more frames of the video stream, verifying an identification of the video camera 110 providing the video stream, verifying timing data associated with the performance of the instruction, and/or verifying geolocation data of the video camera 110 providing the video stream.

In other words, from the perspective of the computing device 204, the method 500 includes a method for video management within a Closed Circuit Television (CCTV) system including receiving, at the computer device via one or more intermediate devices in the CCTV system, a video stream generated by a sensor device of the CCTV system, wherein the video stream includes a plurality of video frames. Further, the method includes sending, by the computer device via the one or more intermediate devices of the CCTV system, an instruction to a sensor device configured to generate a video stream including a plurality of video frames. Also, the method includes receiving, by the computer device via the one or more intermediate devices of the CCTV system, one or more frames of the plurality video frames embedded with metadata associated with performance of the instruction by the sensor device. Additionally, the method includes evaluating performance of the CCTV system using the metadata embedded within the one or more video frames.

Similarly and in other words, from the perspective of the sensor (e.g., camera) 110, the method 500 includes a method for embedding metadata into a video stream within a Closed Circuit Television (CCTV) system that includes generating, by a sensor device of the CCTV system, a video stream including a plurality of video frames, and transmitting, by the sensor device via one or more intermediate devices in the CCTV system, the generated video stream to a receiving computing device. The method further includes receiving, by the sensor device via the one or more intermediate devices in the CCTV system, an instruction from the receiving computing device, and performing, by the sensor device of the CCTV system, the instruction received from the receiving computing device. Also, the method includes embedding, by the sensor device of the CCTV system, metadata associated with performance of the instruction by the sensor device into one or more frames of the plurality video frames. Additionally, the method includes transmitting, by the sensor device via one or more intermediate devices in the CCTV system, metadata associated with performance of the instruction by the sensor device into one or more frames of the plurality video frames.

In one or any combination of these aspects, the metadata embedded within the one or more video frames represents an in-band channel.

In one or any combination of these aspects, at least one of the one or more intermediate devices are configured to alter the video stream to improve transmission and/or storage of the video stream.

In one or any combination of these aspects, evaluating performance of the CCTV system comprises at least one of: verifying proper sequential order of the one or more frames of the video stream, verifying an identification of the sensor device providing the video stream, verifying timing data associated with the performance of the instruction, or verifying geolocation data of the sensor device providing the video stream.

In one or any combination of these aspects, evaluating performance of the CCTV system includes evaluating a round trip latency of the PTZ video camera to the instruction.

In one or any combination of these aspects, the metadata comprises a 2-dimensional bar code representing the metadata.

In one or any combination of these aspects, the 2-dimensional bar code occupies at least a portion of the one or more video frames.

In one or any combination of these aspects, the metadata comprises a sequence of different 2-dimensional bar codes representing a stream of metadata in each of the one or more video frames and wherein the size of the metadata included in the sequence is greater the size of data that can be encoded into a single frame.

In one or any combination of these aspects, the metadata comprises a same metadata in each of the one or more video frames.

In one or any combination of these aspects, the metadata comprises a steganography image.

Advantageously, using in-band data as a general-purpose communications channel enables data transfers beyond the size encoded within one frame. It should be noted that this communication channel is a two-way channel allowing to perform two-way measurements (such as PTZ latency). Advantageously, steganography techniques may be employed to permit in-band communication alongside CCTV operations.

FIG. 6 is a block diagram illustrating a computer system 600 on which aspects of systems and methods for controlling the access to confidential information may be implemented in accordance with an exemplary aspect. The computer system 600 may represent the sensor device 110 or computing device 204 of FIG. 2 and can be in the form of multiple computing devices, or in the form of a single computing device, for example, a desktop computer, a notebook computer, a laptop computer, a mobile computing device, a smart phone, a tablet computer, a server, an embedded device, and other forms of computing devices.

As shown, the computer system 600 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 600, such as those at the time of loading the operating system with the use of the ROM 24.

The computer system 600 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 100. The system memory 22, removable storage devices 27, and non-removable storage devices 28 may use a variety of computer-readable storage media. Examples of computer-readable storage media include machine memory such as cache, static random access memory (SRAM), dynamic random access memory (DRAM), zero capacitor RAM, twin transistor RAM, enhanced dynamic random access memory (eDRAM), extended data output random access memory (EDO RAM), double data rate random access memory (DDR RAM), electrically erasable programmable read-only memory (EEPROM), NRAM, resistive random access memory (RRAM), silicon-oxide-nitride-silicon (SONOS) based memory, phase-change random access memory (PRAM); flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 400.

The system memory 22, removable storage devices 27, and non-removable storage devices 28 of the computer system 600 may be used to store an operating system 35, additional program applications 37, other program modules 38, and program data 39. The computer system 600 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 600 may be equipped with other peripheral output devices (not shown), such as loudspeakers and other audiovisual devices The computer system 600 may operate in a network environment, using a network connection to one or more remote computers 49. The remote computer (or computers) 49 may be local computer workstations or servers comprising most or all of the aforementioned elements in describing the nature of a computer system 600. Other devices may also be present in the computer network, such as, but not limited to, routers, network stations, peer devices or other network nodes. The computer system 600 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

In other words, in an aspect, the computer system 600 includes a hardware processor configured to receive, via one or more intermediate devices in the CCTV system, a video stream generated by a sensor device of the CCTV system. The video stream includes a plurality of video frames. The hardware processor is also configured to: send, via the one or more intermediate devices of the CCTV system, an instruction to a sensor device configured to generate a video stream including a plurality of video frames and receive, via the one or more intermediate devices of the CCTV system, one or more frames of the plurality video frames embedded with metadata associated with performance of the instruction by the sensor device. The hardware processor is further configured to evaluate performance of the CCTV system using the metadata embedded within the one or more video frames.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for video management within a Closed Circuit Television (CCTV) system, comprising:
   receiving, at a computer device via one or more intermediate devices in the CCTV system, a video stream generated by a sensor device of the CCTV system, wherein the video stream includes a plurality of video frames;
   sending, by the computer device via the one or more intermediate devices of the CCTV system, an instruction to the sensor device;
   receiving, by the computer device via the one or more intermediate devices of the CCTV system, one or more frames of the plurality video frames embedded with metadata associated with performance of the instruction by the sensor device, wherein the metadata comprises a 2-dimensional bar code representing the metadata that occupies at least a portion of the one or more frames and wherein a size of the 2-dimensional bar code is selected based on at least a determination of whether the one or more intermediate devices are configured to reduce resolution of the one or more frames embedded with the 2-dimensional bar code; and
   evaluating performance of the CCTV system using the metadata embedded within the one or more frames.

2. The method of claim 1, wherein the metadata embedded within the one or more frames represents an in-band channel.

3. The method of claim 1, wherein at least one of the one or more intermediate devices are configured to alter the video stream to improve transmission and/or storage of the video stream.

4. The method of claim 1, wherein evaluating performance of the CCTV system comprises at least one of: verifying proper sequential order of the one or more frames of the video stream, verifying an identification of the sensor device providing the video stream, verifying timing data associated with the performance of the instruction, or verifying geolocation data of the sensor device providing the video stream.

5. The method of claim 1, wherein the sensor device comprises a pan, tilt, and zoom (PTZ) video camera and wherein evaluating performance of the CCTV system includes evaluating a round trip latency of the instruction.

6. The method of claim 1, wherein the 2-dimensional bar code occupies at least a portion of the one or more frames.

7. The method of claim 1, wherein the metadata comprises a sequence of different 2-dimensional bar codes representing a stream of metadata in each of the one or more frames and wherein the size of the metadata included in the sequence is greater than the size of data that can be encoded into a single frame.

8. The method of claim 1, wherein the metadata comprises a same metadata in each of the one or more frames.

9. The method of claim 1, wherein the metadata comprises a steganography image.

10. A CCTV system for video management, comprising:
a hardware processor configured to:
receive, via one or more intermediate devices in the CCTV system, a video stream generated by a sensor device of the CCTV system, wherein the video stream includes a plurality of frames;
send, via the one or more intermediate devices of the CCTV system, an instruction to a sensor device;
receive, via the one or more intermediate devices of the CCTV system, one or more frames of the plurality frames embedded with metadata associated with performance of the instruction by the sensor device, wherein the metadata comprises a 2-dimensional bar code representing the metadata that occupies at least a portion of the one or more frames and wherein a size of the 2-dimensional bar code is selected based on at least a determination of whether the one or more intermediate devices are configured to reduce resolution of the one or more frames embedded with the 2-dimensional bar code; and
evaluate performance of the CCTV system using the metadata embedded within the one or more frames.

11. The system of claim 10, wherein the metadata embedded within the one or more frames represents an in-band channel.

12. The system of claim 10, wherein at least one of the one or more intermediate devices are configured to alter the video stream to improve transmission and/or storage of the video stream.

13. The system of claim 10, wherein the hardware processor configured to evaluate performance of the CCTV system is configured to do at least one of: verify proper sequential order of the one or more frames of the video stream, verify an identification of the sensor device providing the video stream, verify timing data associated with the performance of the instruction, or verify geolocation data of the sensor device providing the video stream.

14. The system of claim 10, wherein the sensor device comprises a pan, tilt, and zoom (PTZ) video camera and wherein the hardware processor configured to evaluate performance of the CCTV system is further configured to evaluate a round trip latency of the instruction.

15. The system of claim 10, wherein the 2-dimensional bar code occupies at least a portion of the one or more frames.

16. The system of claim 10, wherein the metadata comprises a sequence of different 2-dimensional bar codes representing a stream of metadata in each of the one or more frames and wherein the size of the metadata included in the sequence is greater than the size of data that can be encoded into a single frame.

17. The system of claim 10, wherein the metadata comprises a same metadata in each of the one or more frames.

18. A method in a Closed Circuit Television (CCTV) system, comprising:
generating, by a sensor device of the CCTV system, a video stream including a plurality of frames;
transmitting, by the sensor device via one or more intermediate devices in the CCTV system, the video stream to a receiving computing device;
receiving, by the sensor device via the one or more intermediate devices in the CCTV system, an instruction from the receiving computing device;
performing, by the sensor device of the CCTV system, the instruction received from the receiving computing device;
embedding, by the sensor device of the CCTV system, metadata associated with performance of the instruction by the sensor device into one or more frames of the plurality frames, wherein the metadata comprises a 2-dimensional bar code representing the metadata that occupies at least a portion of the one or more frames and wherein a size of the 2-dimensional bar code is selected based on at least a determination of whether the one or more intermediate devices are configured to reduce resolution of the one or more frames embedded with the 2-dimensional bar code; and
transmitting, by the sensor device via one or more intermediate devices in the CCTV system, the one or more frames embedded with the metadata associated with the performance of the instruction.

* * * * *